(12) United States Patent
Campbell et al.

(10) Patent No.: US 8,892,530 B1
(45) Date of Patent: Nov. 18, 2014

(54) POLICY CONFIGURATION USER INTERFACE

(75) Inventors: Maxine Campbell, Lancaster, SC (US); Cindy Irby, Charlotte, NC (US); Greg Verego, Charlotte, NC (US)

(73) Assignee: Amdocs, Inc., Chesterfield, MO (US)

( * ) Notice: Subject to any disclaimer, the term of this patent is extended or adjusted under 35 U.S.C. 154(b) by 2913 days.

(21) Appl. No.: 10/856,538

(22) Filed: May 28, 2004

(51) Int. Cl.
 *G06F 17/30* (2006.01)

(52) U.S. Cl.
 USPC ........................................................ 707/694

(58) Field of Classification Search
 USPC .................. 707/201, 805, 810, 781, 694, 769
 See application file for complete search history.

(56) References Cited

U.S. PATENT DOCUMENTS

| | | | | |
|---|---|---|---|---|
| 5,263,164 A * | 11/1993 | Kannady et al. | .................. | 713/1 |
| 6,175,831 B1 | 1/2001 | Weinreich et al. | | |
| 6,463,470 B1 | 10/2002 | Mohaban et al. | | |
| 6,484,150 B1 | 11/2002 | Blinn et al. | | |
| 6,604,107 B1 | 8/2003 | Wang | | |
| 7,533,113 B1 | 5/2009 | Haddad | | |
| 7,716,240 B2 * | 5/2010 | Lim | ............................. | 707/781 |
| 8,150,816 B2 * | 4/2012 | Lim | ............................. | 707/694 |
| 8,185,548 B2 * | 5/2012 | Lim | ............................. | 707/781 |
| 8,661,003 B2 * | 2/2014 | Lim | ............................. | 707/694 |
| 2002/0107754 A1 * | 8/2002 | Stone | ............................. | 705/26 |
| 2002/0161620 A1 * | 10/2002 | Hatanaka et al. | ................ | 705/10 |
| 2003/0084428 A1 * | 5/2003 | Agostini et al. | ............. | 717/117 |
| 2003/0115204 A1 | 6/2003 | Greenblatt et al. | | |
| 2003/0115246 A1 | 6/2003 | Mahon et al. | | |
| 2003/0120683 A1 * | 6/2003 | Roma et al. | ................. | 707/104.1 |
| 2003/0125979 A1 * | 7/2003 | Dangler et al. | .................... | 705/1 |
| 2003/0163783 A1 * | 8/2003 | Chikirivao et al. | ........... | 715/513 |
| 2004/0024888 A1 * | 2/2004 | Davis et al. | ..................... | 709/229 |
| 2004/0044603 A1 * | 3/2004 | Gordon-Ervin et al. | ........ | 705/34 |
| 2004/0230829 A1 | 11/2004 | Dogan et al. | | |
| 2007/0156659 A1 * | 7/2007 | Lim | ................................. | 707/3 |
| 2007/0156670 A1 * | 7/2007 | Lim | ................................. | 707/4 |
| 2010/0223287 A1 * | 9/2010 | Lim | ............................. | 707/769 |
| 2012/0150359 A1 * | 6/2012 | Westergaard | ................. | 700/291 |
| 2012/0191677 A1 * | 7/2012 | Lim | ............................. | 707/694 |

OTHER PUBLICATIONS

Non-Final Office Action Dated Jul. 8, 2008, U.S. Appl. No. 10/856,384.
Non-Final Office Action, Dated Feb. 5, 2009, U.S. Appl. No. 10/856,384.
Final Office Action Dated Aug. 18, 2009, U.S. Appl. No. 10/856,384.
Non-Final Office Action Dated, Nov. 10, 2009, U.S. Appl. No. 10/856,384.
Office Action dated Jun. 4, 2010 for corresponding U.S. Appl. No. 10/856,384.
Non-Final Office Action from U.S. Appl. No. 10/856,384, dated Nov. 6, 2013.

\* cited by examiner

*Primary Examiner* — Jean M Corrielus
(74) *Attorney, Agent, or Firm* — Zilka-Kotab, PC

(57) ABSTRACT

A flexible, modifiable, and sophisticated rules processing engine includes a user interface through which customers may design and modify a wide range of rules. The customer may thereby setup rules that determine any action, template, or other resultant appropriate to or for their input data. Consequently, the customer may develop sophisticated processing patterns tailored to their own input data, without the time and expense associated with obtaining a custom solution from a software vendor.

20 Claims, 12 Drawing Sheets

| Priority | Name | Amount | Account Type | Delivery Method | Begin Date | End Date | Print |
|---|---|---|---|---|---|---|---|
| 1 | Policy 1 | | = Private Network | = Print | = Jul 26, 2002 | = Aug 26, 2002 | Yes |
| 2 | Policy 2 | < 5.00 | = Regular | = Print | = Jan 1, 2002 | = Aug 26, 2002 | Yes |
| 3 | Minimal | < 1.00 | = Regular | = Both | = Jan 1, 2002 | = Aug 26, 2007 | No |
| 4 | Policy 4 | < 20.00 | | | = Jun 23, 2002 | = Aug 26, 2002 | No |
| 5 | Policy 5 | < 50.00 | = Private Network | = Print | = Jun 23, 2002 | = Aug 26, 2002 | Yes |
| 6 | Default | | | | | | No |

806  804  808  812  814  810

802

Add...  Modify...  Priorities...  Copy...
816  818  820  822

Add Minimum Bill Threshold Policy

| | | |
|---|---|---|
| Name: | New MBT | 902 |
| Minimum Bill Amount: | 904  3.00 | 910 |
| Effective Begin Date: | 906  Aug. 12, 2002 | |
| Effective End Date: | 908  Aug. 12, 2002 | 912 |

Condition Details

Type: 914 Account Type ▼   Operator: 918 = ▼   926

Value: 916 Private Network ▼   Add...

Conditions

| Determinant Type | Value |
|---|---|
| Account Type | = Private Network |
| Delivery Method | = Print |

922   924

920

930  932 928  Remove...

OK  Clear...  Cancel

POLICY CONFIGURATION USER INTERFACE

BACKGROUND

1. Technical Field

The present invention relates to configuring evaluation rules applied to data in a data processing system. In particular, the present invention relates to a policy configuration user interface for designing rules applied to customer data to determine a resultant action, data presentation template, or other consequent consistent with input customer data.

2. Background Information

The technologies supporting automated data processing of customer data, driven by strong market demand, have matured rapidly and become quite powerful in a relatively short time period. As a result, processing system hardware is now powerful enough and fast enough to execute complex calculations on large volumes of customer data for a multitude of purposes. However, the rapid advances in processing system hardware tend to outpace corresponding advances in software.

As one example, past approaches to processing customer data (e.g., preparing invoices) generally relied upon inflexible hardcoded processing steps. While the software might have captured the desired processing steps at the time the software was written, its hardcoded nature made the software inflexible, and in some cases, unsuitable for the customer at a later date. With such software, the customer could only initiate changes, if at all, through an expensive, time consuming re-programming process that required a software vendor programmer to modify the software by hand to suit customer specifications.

Even when a customer was willing to incur the expense and delay, the modified software still had drawbacks. As an example, with every custom software release came the need for individuals to track, understand, and support the software. Consequently, custom software increased the costs for the software vendor as well as the customer, and led to a general lack of standardization that hampered efficient production, delivery, and support of the software.

A need has long existed for addressing the problems noted above and other previously experienced.

BRIEF SUMMARY

Methods and systems consistent with the invention provide a flexible, modifiable, and sophisticated rules processing engine for processing input data. The rules processing engine may apply a wide range of rules against customer input data in order to determine any action, template, or other resultant appropriate to or for the input data. As a result, the customer may develop sophisticated processing patterns, through a user interface, for example, that are tailored to their own input data, without intervention from the software vendor.

In one method consistent with the invention, a data processing system interfaces an operator to policy configuration processing performed by the data processing system. The method includes displaying a policy configuration interface showing a policy set belonging to a policy group, and accepting a policy selection of a policy from the policy set. In addition, the method includes displaying a policy modification interface for the policy and accepting a policy modification directive through the policy modification interface for the policy. In response, the data processing system may then modify the policy in the policy group according to the policy modification.

A data processing system consistent with the invention includes a display, a memory, and a processor coupled to the memory. The memory holds a policy configuration user interface definition. The user interface definition specifies a policy configuration detail interface that includes a policy detail panel for displaying a policy set belonging to a policy group. The user interface definition may also include a policy configuration interface. The processor generates on the display a policy configuration interface according to the policy configuration interface definition.

BRIEF DESCRIPTION OF THE DRAWINGS

FIG. 8 illustrates the policy display details of the policy display interface shown in FIG. 7.

FIG. 9 shows a policy configuration interface of a ruleset user interface that the processing system shown in FIG. 1 may display.

DETAILED DESCRIPTION

Figure 1:
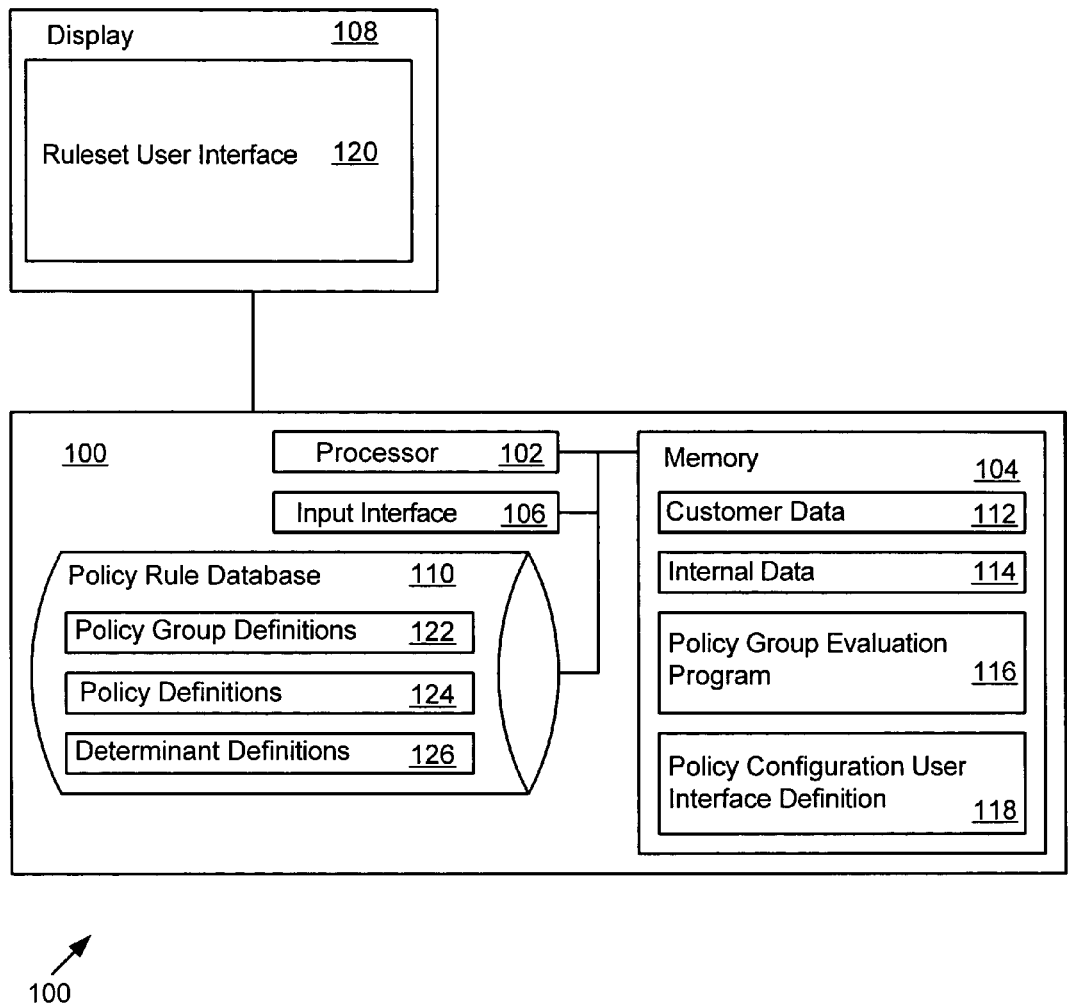
FIG. 1 illustrates a data processing system that incorporates a policy group rules engine for processing customer data.

FIG. 1 shows a data processing system 100 that applies a powerful and extensible rules processing system against customer data. The data processing system 100 includes a processor 102, a memory 104, and an input interface 106. The data processing system 100 further includes a display 108 and a policy rule database 110.

The memory 104 stores data, for example the customer data 112, the internal data 114, and programs, for example the policy group evaluation program 116 and the policy configuration user interface definition 118. A ruleset user interface 120, described in more detail below, assists an operator to design policies for application to the customer data 112. The policy rule database 110 implements a data model for the rules engine, including, as examples, policy group definitions 122, policy definitions 124, and determinant definitions 126.

The elements illustrated in FIG. 1 interoperate as explained in more detail below. Before setting forth any additional explanation, however, it is noted that all of the discussion below, regardless of the particular implementation being described, is exemplary in nature, rather than limiting. For example, although selected aspects, features, or components of the implementations are depicted as being stored in the memory 104 and policy rule database 110, all or part of systems and methods consistent with the present invention may be stored on or read from other machine-readable media, for example, secondary storage devices such as hard disks, floppy disks, and CD-ROMs; a signal received from a network; or other forms of machine readable memory either currently known or later developed.

Furthermore, although for discussion purposes specific components of the data processing system 100 will be described, methods, systems, and articles of manufacture consistent with the policy group rules engine may include additional or substitute different components. For example, the processor 102 may be a microprocessor, microcontroller, application specific integrated circuit (ASIC), discrete logic, or a combination of other types of circuits acting as explained below. Similarly, the memory 104 may be DRAM, SRAM, Flash or any other type of memory. The policy rule database 110 may be separately stored and managed, split into multiple databases, and generally logically and physically organized in many different ways. Furthermore, the policy rule database 110 may more generally represent data files searchable using techniques other than relational database queries, for example. The individual programs discussed below may be parts of a single program, separate programs, program libraries, or distributed across several memories and processors.

Figure 2:
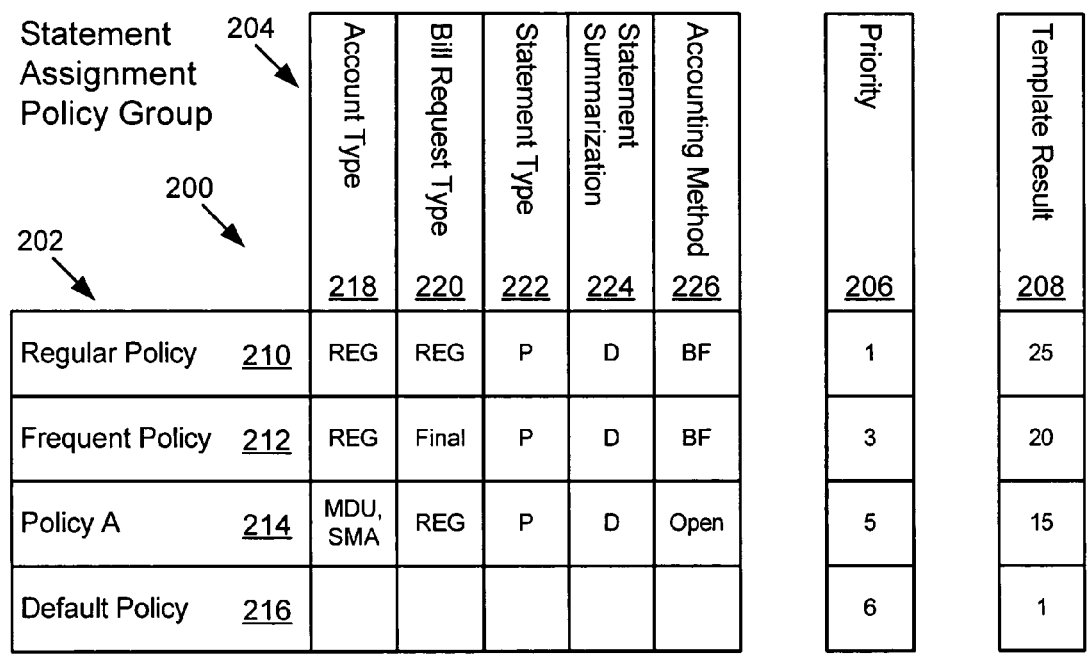
FIG. 2 illustrates a conceptual view of a policy group including multiple policies that may be setup in the policy rule database present in the data processing system shown in FIG. 1.

With regard to FIG. 2, that figure presents a conceptual view of a policy group 200. The policy group 200 includes multiple policies 202 and determinants 204, priority values 206, and a resultant specifier 208. The policy group 200 is a statement assignment policy group that determines a billing statement template appropriate for a particular cable television customer, based on the input customer data 112.

Generally, however, a policy group may be established to process any data, including the system internal data 114. Thus, for example, the processing system 100 may make decisions concerning its own operation by applying a system policy group to the internal data 114. Such policy groups may determine, as examples, when to backup data, when to initiate system maintenance procedures, or any other system task appropriate to the data processing system 100.

For the discussion below, it is noted that the processor 102 generally operates under control of the policy group evaluation program 116. In other words, the processor 102 executes the instructions of the evaluation program 116 in order to proceed as noted below. In one implementation, the policy group evaluation program 116 is a Java™ program, although other programming languages may alternatively or additionally implement the evaluation program 116.

The policies 202 represent individual rules that are applied against the customer data 112. In the example shown in FIG. 2, the policies 202 include a Regular policy 210, a Frequent policy 212, a Policy A 214, and a Default policy 216. Each policy 202 is associated with a priority value 206 that determines the order in which the processor 102 applies the policy. As shown in FIG. 2, the priority values are positive integers, with lower priority values indicating higher priority. Other priority plans may be employed, however.

The policy group 200 is associated with a determinant group 204. The determinant group 204 represents data items included in the customer data 112 and forms the basis for tests against the policies 202. As shown in FIG. 2, the determinant group 204 includes an Account Type determinant 218, a Bill Request Type determinant 220, a Statement Type determinant 222, a Statement Summarization determinant 224, and an Accounting Method determinant 226.

Each policy 202 may specify determinant values for zero or more determinants that characterize the policy group 200. For example, the Regular policy 210 includes a 'REG' determinant value for the Account Type determinant 218, a 'REG' determinant value for the Bill Request Type determinant 220, a 'P' determinant value for the Statement Type determinant 222, a 'D' determinant value for the Statement Summarization determinant 224, and a 'BF' determinant value for the Accounting Method determinant 226.

The determinant values may be one or more numeric, string, or other values. Examples are given next, and it is noted that the determinant values may vary according to any particular implementation desired. The determinant value for the Account Type determinant 218 may be 'REG' for a regular account, 'MDU' for a multiple dwelling unit account, or 'SMA' for a multiple delivery unit. The determinant value for the Bill Request Type determinant 220 may be 'Final' for a final billing statement, or 'REG' for a regular monthly billing statement. The determinant value for the Statement Type determinant 222 may be 'P' for a payable bill, 'R' for a reporting statement, or 'I' for an informational statement. The determinant value for the Statement Summarization determinant 224 may be 'D' for a detail billing statement, or 'S' for a summary billing statement. The determinant value for the Accounting Method determinant 226 may be 'BF' for a balance forward accounting method, or 'Open' for an open item accounting method.

In addition, each policy 202 may include a resultant specifier 208. For example, the Regular policy 210 includes the resultant specifier '25' to indicate that billing template 25 should be used to bill the customer, if the Regular policy 210 evaluates to True. The resultant specifier 208 thereby indicates a resultant appropriate for the input data. The resultant specifier may take many forms, as examples, a data presentation template specifier (e.g., '25'), a processing action specifier (e.g., a function to call to process the customer data), or any other indicator of a resultant.

The resultant specifier may indicate a multi-valued resultant. Consequently, the resultant specifier may include two or more values consistent with the decision made by the policy. As one example, the resultant specifier may not only indicate a billing template for the customer, but may also indicate a special message to be printed as part of the bill. The resultant specifier may then take a multi-valued form ('25', '17'), for example, that would cause the processor 102 to print Message 17 (e.g., "Welcome, new customer.") on a bill formatted according to Template 25.

When running bills for customer, the processor 102 selects the policy group 200 for application to the customer data. The processor 102 then evaluates the policies 202 until it finds a policy 202 that evaluates to True. By checking the value of the resultant specifier 208 in the policy that evaluated to True, the processor 102 identifies the resultant specifier (e.g., '25') as indicative of the resultant (e.g., Template 25).

With regard to the example shown in FIG. 2, the processor 102 applies the policies 202 according to their priorities. The determinant values, in one implementation, are tested to determine if all are satisfied. If so, the policy evaluates to True. That is, the determinant values are used in an AND test to determine whether the policy evaluates to True.

To that end, the processor 102 retrieves the customer data 112 for the customer currently being processed. Thus, starting with the Regular policy 210, the processor 102 determines if the customer data 112, as stored, indicates that the customer is set for 'REG' for the Account Type and 'REG' for the Bill Request Type and 'P' for the Statement Type and 'D' for Statement Summarization and 'BF' for Accounting Method. If so, the Regular policy 210 evaluates to True, and the processor 102 identifies the resultant specifier '25' as indicative of the resultant appropriate (e.g., billing template 25) for the customer data.

If the Regular policy 210 evaluates to False, the processor 102 retrieves the next highest priority policy for evaluation. In this example, the processor 102 would next apply the Frequent policy 212 to the customer data, then the Policy A policy 214 to the customer data. Note that a policy 202 may specify a multiple determinate values for any single determinant. For example, the Policy A policy 214 specifies that the determinant values 'MDU' and 'SMA' for the Account Type determinant 218. In one implementation, the processor 102 may interpret multiple determinant values for a single determinant as a disjunctive determinant value. In doing so, the processor 102 tests whether the customer data for Account Type matches 'MDU' OR 'SMA'. The Policy A policy 214 therefore evaluates to True when the customer data matches: ((AccountType='MDU' OR AccountType='SMA') AND Bill RequestType='REG'' AND StatementType='P' AND StatementSummarization='D' & AccountingMethod='Open').

Finally, if none of the prior policies 202 evaluated to True, the processor 102 would apply the Default policy 216. The Default policy has the lowest priority and, like the other policies 202, includes a resultant specifier, in this case '1'. However, in one implementation, the Default policy always evaluates to True, so that the processor 102 may always determine a resultant for the customer data. To that end, the Default policy specifies an always True setting (in this case, an absence of a determinant value) for all of the determinants 204. As a result, the processor 102 interprets the Default policy 216 to match the customer data for each determinant, thereby rendering the Default policy 216 True in all cases.

In general, the policy rule database 110 may store policy group definitions for many decision tasks. As examples, the policy rule database 110 may include a policy group definition for determining how to handle a delinquent account, or how to process a refund. Each policy group may have its own determinant group and constituent policies.

An exemplary implementation of an Oracle™ database data model in the policy rule database 110 is presented below. The tables show how the policy groups, determinants, and other data may be defined and maintained in the policy rule database 110. Other implementations are also suitable, however, and may vary substantially from system to system.

Note that the Version fields shown below may be used in conjunction with concurrent access to the database. When a record is read, the version number is returned. Before changes are made to the record, the system may ensure that the version number is the same. If the version number is different, the system may re-read the record with locking enabled. Upon updating the record, the Version field may be incremented.

TABLE 1

OPERAND_GROUP_DEFINITION

| Col. Seq | Column | Nulls | Type |
|---|---|---|---|
| 10 | OPERAND_GROUP_DEFINITION_ID | NOT NULL | NUMBER (18) |
| 20 | OPERAND_TYPE_ID | NOT NULL | NUMBER (18) |
| 25 | OPERAND_GROUP_ID | NOT NULL | NUMBER (18) |
| 30 | POLICY_GROUP_DEFINITION_ID | NULL | NUMBER (18) |
| 40 | CREATED_BY | NOT NULL | VARCHAR2 (30) |
| 50 | CREATED_TS | NOT NULL | TIMESTAMP ( ) |
| 55 | VERSION | NULL | NUMBER (10) |
| 60 | LAST_MODIFIED_BY | NULL | VARCHAR2 (30) |
| 70 | LAST_MODIFIED_TS | NULL | TIMESTAMP ( ) |
| 80 | IS_REQUIRED | NULL | NUMBER (1) |
| 90 | IS_SINGLED_VALUED | NULL | NUMBER (1) |

Primary Key
Name            Column
OPGPDF_PK       OPERAND_GROUP_DEFINITION_ID
Foreign Keys
OPGPDF_POLGDF_FK01
POLICY_GROUP_DEFINITION_ID references
POLICY_GROUP_DEFINITION.POLICY_GROUP_DEFINITION_ID
Transferable?   Yes   Update Rule:   Restricted
Mandatory?      Yes   Delete Rule:   Restricted The OPERAND_GROUP_DEFINITION table defines how determinants or resultants are grouped for presentation on the user interface 120. For example, if the Policy Group Definition groups House Number and Street Name (two separate determinants) together for display and evaluation, a Group named 'Street Address' may be created and attached to the two determinants.

The OPERAND_GROUP_DEFINITION_ID field may provide a unique identifier for the Operand Group Definition. The OPERAND_TYPE_ID field may provide a code indicating whether this Operand Group Definition describes a Determinant or a Result. The OPERAND_GROUP_ID field may provide a code identifying the specific operand group, such as 'Street Address'.

The POLICY_GROUP_DEFINITION_ID field may provide an identifier of a policy group definition. The CREATED_BY field may provide the ID of the user or application that created this record. The CREATED_TS field may provide the date/time that this record was created. The VERSION field may provide a sequential number used to identify historical changes to a particular bill request type configuration.

The LAST_MODIFIED_BY field may provide an identifier of an Application or User which last modified the bill request type configuration row. The LAST_MODIFIED_TS field may provide the date and time that the bill request type configuration row was last modified. The IS_REQUIRED field may indicate whether or not this operand group is set up when a policy is established. The IS_SINGLED_VALUED field may indicate whether or not this operand group may be used multiple times when setting up a policy. Using the same result multiple times allows the customer to create an "and" condition between groups of the same type.

TABLE 2

POLICY_GROUP_DEFINITION

| Col. Seq | Column | Nulls | Type |
|---|---|---|---|
| 10 | POLICY_GROUP_DEFINITION_ID | NOT NULL | NUMBER (18) |
| 20 | POLICY_GROUP_TYPE_ID | NOT NULL | NUMBER (18) |
| 60 | CREATED_BY | NOT NULL | VARCHAR2 (30) |
| 65 | CREATED_TS | NOT NULL | TIMESTAMP ( ) |
| 80 | VERSION | NULL | NUMBER (10) |
| 90 | LAST_MODIFIED_BY | NULL | VARCHAR2 (30) |
| 100 | LAST_MODIFIED_TS | NULL | TIMESTAMP ( ) |

Primary Key
| Name | Column |
|---|---|
| POLGDF_PK | POLICY_GROUP_DEFINITION_ID |

The POLICY_GROUP_DEFINITION table contains the information that defines a particular set of policies. The POLICY_GROUP_DEFINITION table may establish, through an associated POLICY_OPERAND_DEFINITION table, the determinants and results that may be used to develop a policy within the given policy group. In one implementation, all customers may share the same Policy Group Definitions.

The POLICY_GROUP_DEFINITION_ID field may provide a unique identifier for the Policy Group Definition. The POLICY_GROUP_TYPE_ID field may provide a unique identifier for the Policy Group Type. The CREATED_BY field may provide the ID of the user or batch process that created the record.

The CREATED_TS field may provide the date the record was created by the application. The VERSION field may provide a sequential number used to identify historical changes to a particular bill request type configuration. The LAST_MODIFIED_BY field may provide an ID of the Application or User which last modified the bill request type configuration row. The LAST_MODIFIED_TS field may provide the date and time that the bill request type configuration row was last modified.

TABLE 3

POLICY_OPERAND

| Col. Seq | Column | Nulls | Type |
|---|---|---|---|
| 10 | POLICY_OPERAND_ID | NOT NULL | NUMBER (18) |
| 11 | RETAILER_POLICY_ID | NULL | NUMBER (18) |
| 12 | OPERAND_TYPE_ID | NOT NULL | NUMBER (18) |
| 15 | OPERAND_ID | NOT NULL | NUMBER (18) |
| 40 | OPERAND_DATA_TYPE_ID | NOT NULL | NUMBER (18) |
| 50 | CREATED_BY | NOT NULL | VARCHAR2 (30) |
| 60 | CREATED_TS | NOT NULL | TIMESTAMP ( ) |
| 61 | VERSION | NULL | NUMBER (10) |
| 63 | LAST_MODIFIED_BY | NULL | VARCHAR2 (30) |
| 66 | LAST_MODIFIED_TS | NULL | TIMESTAMP ( ) |
| 86 | POLICY_OPERAND_GROUP_ID | NULL | NUMBER (18) |
| 100 | DSP_ORDER_SEQ_NUMBER | NOT NULL | NUMBER (10) |

Primary Key
| Name | Column |
|---|---|
| POLOPR_PK | POLICY_OPERAND_ID |

Foreign Keys
POLOPR_POPGRP_FK01
POLICY_OPERAND_GROUP_ID references
POLICY_OPERAND_GROUP.POLICY_OPERAND_GROUP_ID
Transferable? Yes  Update Rule:  Restricted
Mandatory?   No   Delete Rule:  Restricted
POLOPR_RETPOL_FK01
RETAILER_POLICY_ID references RETAILER_POLICY.RETAILER_POLICY_ID
Transferable? Yes  Update Rule:  Restricted
Mandatory?   Yes  Delete Rule:  Restricted The POLICY_OPERAND table defines a single determinant or result for the customer's policy. If the same operand is participating both singly and in a group, it may have two retailer policy operand instances to separately define the values associated with the operand in each of its roles.

The POLICY_OPERAND_ID field may provide a unique identifier for the retailer policy operand. The RETAILER_POLICY_ID field may provide a unique ID for the policy. The OPERAND_TYPE_ID field may provide a code that indicates whether this Policy Operand Definition describes a Determinant or a Result.

The OPERAND_ID field may provide a code that identifies the specific result field, such as 'Account Balance'. The OPERAND_DATA_TYPE_ID field may provide a code that identifies the data type of the result field, such as 'String'. The CREATED_BY field may provide the ID of the user that created this record.

The CREATED_TS field may provide the date/time that this record was created. The VERSION field may provide a sequential number that identifies historical changes to a particular bill request type configuration. The LAST_MODIFIED_BY field may provide an ID of the Application or User which last modified the bill request type configuration row.

The LAST_MODIFIED_TS field may provide the date and time that the bill request type configuration row was last modified. The POLICY_OPERAND_GROUP_ID field may provide a unique identifier for the retailer policy operand group. The DSP_ORDER_SEQ_NUMBER field may provide the order in which this item will be displayed.

a policy for a given policy group. Each determinant definition may reference a list of one or more valid operators to be used with that determinant. Each resultant definition may reference the "=" operator.

The POLICY_OPERAND_DEFINITION_ID field may provide a unique number referencing a particular determinant or result definition. The OPERAND_TYPE_ID field may provide a code used to indicate whether this Policy Operand Definition describes a Determinant or a Result. The OPERAND_ID field may provide a code that identifies the specific result field, such as 'Account Balance'.

The OPERAND_DATA_TYPE_ID field may provide a code that identifies the data type of the result field, such as 'String'. The POLICY_GROUP_DEFINITION_ID may provide a unique number that references, in one implementation, one and only one Policy Group Definition. The VALID_OPERATOR_ID_LIST may provide a comma delimited list of Operator IDs referencing the Operators (e.g., "=", "<", ">", and other operators) that are valid for the operand.

The CREATED_BY field may provide the ID of the user that created this record. The CREATED_TS field may provide the date/time that this record was created. The VERSION field may provide a sequential number used to identify historical changes to a particular bill request type configuration. The LAST_MODIFIED_BY field may provide an ID of the Application or User which last modified the bill request type configuration row.

The LAST_MODIFIED_TS field may provide the date and time that the bill request type configuration row was last

TABLE 4

POLICY_OPERAND_DEFINITION

| Col. Seq | Column | Nulls | Type |
| --- | --- | --- | --- |
| 10 | POLICY_OPERAND_DEFINITION_ID | NOT NULL | NUMBER (18) |
| 20 | OPERAND_TYPE_ID | NOT NULL | NUMBER (18) |
| 30 | OPERAND_ID | NOT NULL | NUMBER (18) |
| 40 | OPERAND_DATA_TYPE_ID | NOT NULL | NUMBER (18) |
| 50 | POLICY_GROUP_DEFINITION_ID | NULL | NUMBER (18) |
| 60 | VALID_OPERATOR_ID_LIST | NOT NULL | VARCHAR2 (200) |
| 70 | CREATED_BY | NOT NULL | VARCHAR2 (30) |
| 80 | CREATED_TS | NOT NULL | TIMESTAMP ( ) |
| 90 | VERSION | NULL | NUMBER (10) |
| 100 | LAST_MODIFIED_BY | NULL | VARCHAR2 (30) |
| 110 | LAST_MODIFIED_TS | NULL | TIMESTAMP ( ) |
| 130 | OPERAND_GROUP_DEFINITION_ID | NULL | NUMBER (18) |
| 140 | OPERAND_DATA_TYPE_CATEGORY_ID | NULL | NUMBER (18) |
| 150 | IS_REQUIRED | NULL | NUMBER (1) |
| 160 | IS_SINGLED_VALUED | NULL | NUMBER (1) |
| 170 | OPERAND_SIZE | NULL | NUMBER (10) |

Primary Key
Name            Column
POLOPD_PK       POLICY_OPERAND_DEFINITION_ID
Foreign Keys
POLOPD_OPGPDF_FK01
OPERAND_GROUP_DEFINITION_ID references
OPERAND_GROUP_DEFINITION.OPERAND_GROUP_DEFINITION_ID
Transferable?   Yes     Update Rule:    Restricted
Mandatory?      No      Delete Rule:    Restricted
POLOPD_POLGDF_FK01
POLICY_GROUP_DEFINITION_ID references
POLICY_GROUP_DEFINITION.POLICY_GROUP_DEFINITION_ID
Transferable?   Yes     Update Rule:    Restricted
Mandatory?      Yes     Delete Rule:    Restricted
Index Summary
Name Seq.           Column Index                    Type
POLOPD_UK01_INDX    5 POLICY_GROUP_DEFINITION_ID    UNIQUE
POLOPD_UK01_INDX    10 OPERAND_ID                   UNIQUE The POLICY_OPERAND_DEFINITION table defines the determinants and results that may be used when creating modified. The OPERAND_GROUP_DEFINITION_ID field may provide a unique identifier for the Operand Group Definition. The OPERAND_DATA_TYPE_CATEGORY_ID field may provide a code that may be used to provide a list of valid values for this result for viewing and validating through the user interface 120.

The IS_REQUIRED field may indicate whether or not the operand is required. The IS_SINGLED_VALUED field may provide a flag indicating whether the result consists of one or multiple values. The OPERAND_SIZE field may provide a field length of either the "RESULT" or "DETERMINANT" operand.

The SEQUENCE_NUMBER field may provide the order in which this operand will be displayed, for example in the user interface 120. The POLICY_OPERAND_DEFINITION_ID field may provide a unique identifier for the policy operand to be displayed (by itself or within a group). The OPERAND_GROUP_DEFINITION_ID field, when this item represents a group, may provide a unique identifier for the group. When the item not a group, this field may be 0.

The CREATED_BY field may provide the ID of the user that created this record. The CREATED_TS field may pro-

TABLE 5

POLICY_OPERAND_DSP_ORDER

| Col. Seq | Column | Nulls | Type |
|---|---|---|---|
| 10 | POLICY_OPERAND_DSP_ORDER_ID | NOT NULL | NUMBER (18) |
| 15 | POLICY_GROUP_DEFINITION_ID | NULL | NUMBER (18) |
| 20 | OPERAND_TYPE_ID | NOT NULL | NUMBER (18) |
| 20 | SEQUENCE_NUMBER | NOT NULL | NUMBER (10) |
| 30 | POLICY_OPERAND_DEFINITION_ID | NOT NULL | NUMBER (18) |
| 40 | OPERAND_GROUP_DEFINITION_ID | NULL | NUMBER (18) |
| 50 | CREATED_BY | NOT NULL | VARCHAR2 (30) |
| 60 | CREATED_TS | NOT NULL | TIMESTAMP ( ) |
| 61 | VERSION | NULL | NUMBER (10) |
| 63 | LAST_MODIFIED_BY | NULL | VARCHAR2 (30) |
| 66 | LAST_MODIFIED_TS | NULL | TIMESTAMP ( ) |

Primary Key
Name            Column
OPDODR_PK       POLICY_OPERAND_DSP_ORDER_ID
Foreign Keys
OPDODR_OPGPDF_FK01
OPERAND_GROUP_DEFINITION_ID references
OPERAND_GROUP_DEFINITION.OPERAND_GROUP_DEFINITION_ID
Transferable?   Yes   Update Rule:   Restricted
Mandatory?      No    Delete Rule:   Restricted
OPDODR_POLGDF_FK01
POLICY_GROUP_DEFINITION_ID references
POLICY_GROUP_DEFINITION.POLICY_GROUP_DEFINITION_ID
Transferable?   Yes   Update Rule:   Restricted
Mandatory?      Yes   Delete Rule:   Restricted
OPDODR_POLOPD_FK01
POLICY_OPERAND_DEFINITION_ID references
POLICY_OPERAND_DEFINITION.POLICY_OPERAND_DEFINITION_ID
Transferable?   Yes   Update Rule:   Restricted
Mandatory?      Yes   Delete Rule:   Restricted The Policy Operand Display Order data object may be used by the user interface 120 to determine what order results or determinants will appear on the display 108. When a group is defined, the operand ID may define the sequence of an operand within the group.

The POLICY_OPERAND_DSP_ORDER_ID field may provide a unique identifier for the Policy Operand Display Order item. The POLICY_GROUP_DEFINITION_ID field may provide a unique identifier for the Policy Group Definition. The OPERAND_TYPE_ID field may provide a code that indicates whether this Operand Display Order item describes a Determinant or a Result.

vide the date/time that this record was created. The VERSION field may provide a sequential number that identifies historical changes to a particular bill request type configuration.

The LAST_MODIFIED_BY field may provide an ID of the Application or User which last modified the bill request type configuration row. The LAST_MODIFIED_TS field may provide the date and time that the bill request type configuration row was last modified.

TABLE 6

POLICY_OPERAND_GROUP

| Col. Seq | Column | Nulls | Type |
|---|---|---|---|
| 5 | POLICY_OPERAND_GROUP_ID | NOT NULL | NUMBER (18) |
| 10 | OPERAND_TYPE_ID | NOT NULL | NUMBER (18) |
| 12 | OPERAND_GROUP_ID | NOT NULL | NUMBER (18) |
| 13 | RETAILER_POLICY_ID | NULL | NUMBER (18) |
| 42 | CREATED_BY | NOT NULL | VARCHAR2 (30) |
| 43 | CREATED_TS | NOT NULL | TIMESTAMP ( ) |
| 53 | VERSION | NOT NULL | NUMBER (10) |

TABLE 6-continued

POLICY_OPERAND_GROUP

| Col. Seq | Column | Nulls | Type |
|---|---|---|---|
| 90 | LAST_MODIFIED_BY | NULL | VARCHAR2 (30) |
| 100 | LAST_MODIFIED_TS | NULL | TIMESTAMP ( ) |

Primary Key
Name           Column
POPGRP_PK      POLICY_OPERAND_GROUP_ID
Foreign Keys
POPGRP_RETPOL_FK01
RETAILER_POLICY_ID references RETAILER_POLICY.RETAILER_POLICY_ID
Transferable?  Yes   Update Rule:   Restricted
Mandatory?     Yes   Delete Rule:   Restricted The POLICY_OPERAND_GROUP table defines a determinant or resultant group of operands that may be evaluated together.

The POLICY_OPERAND_GROUP_ID field may provide a unique identifier for the retailer policy operand group. The OPERAND_TYPE_ID field may provide a code that indicates whether this Operand Group Definition describes a Determinant or a Result. The OPERAND_GROUP_ID field may provide a code that identifies the specific operand group, such as 'Street Address'.

The RETAILER_POLICY_ID field may provide a unique ID for the policy. The CREATED_BY field may provide the ID of the user or process that created the record. The CREATED_TS field may provide the date the record was created.

Multiple organizations (e.g., multiple retailers) may setup policy groups within the same database. For example, Alpha cable company and Beta cable company may establish independent statement template policy groups. Each policy group may then represent the preferred rules for each company. The retailer identifier may identify the retailer that owns or that is associated with any particular policy or policy group.

The VERSION field may provide a version number of the row. When the row is modified, the version number may be incremented. The LAST_MODIFIED_BY field may provide the Application or User which last modified the bill request type configuration row. The LAST_MODIFIED_TS field may provide the date and time that the bill request type configuration row was last modified.

TABLE 7

POLICY_OPERAND_VALUE

| Col. Seq | Column | Nulls | Type |
|---|---|---|---|
| 5 | POLICY_OPERAND_VALUE_ID | NOT NULL | NUMBER (18) |
| 10 | POLICY_OPERAND_ID | NULL | NUMBER (18) |
| 20 | OPERAND_TYPE_ID | NOT NULL | NUMBER (18) |
| 25 | OPERATOR_ID | NOT NULL | NUMBER (18) |
| 30 | MINIMUM_VALUE | NOT NULL | VARCHAR2 (240) |
| 50 | CREATED_BY | NOT NULL | VARCHAR2 (30) |
| 60 | CREATED_TS | NOT NULL | TIMESTAMP ( ) |
| 61 | VERSION | NULL | NUMBER (10) |
| 63 | LAST_MODIFIED_BY | NULL | VARCHAR2 (30) |
| 66 | LAST_MODIFIED_TS | NULL | TIMESTAMP ( ) |
| 76 | MAXIMUM_VALUE | NULL | VARCHAR2 (240) |

Primary Key
Name          Column
POLOPV_PK     POLICY_OPERAND_VALUE_ID
Foreign Keys
POLOPV_POLOPR_FK01
POLICY_OPERAND_ID references POLICY_OPERAND.POLICY_OPERAND_ID
Transferable?  Yes   Update Rule:   Restricted
Mandatory?     Yes   Delete Rule:   Restricted Policy Operand Value is a table that encapsulates the operators and values for a determinant or result. For a determinant, the operator represents how this field may be evaluated against input data (equals, not equals, greater than, and so forth), while the values indicate the comparison value(s). For a result, the operator may be 'equals', and the minimum value may contain the value to return should this policy evaluate to true.

The POLICY_OPERAND_VALUE_ID field may provide a unique number referencing a particular determinant or result definition. The POLICY_OPERAND_ID field may provide a unique identifier for the retailer policy operand. The OPERAND_TYPE_ID field may provide a code used to indicate whether this Operand Group Definition describes a Determinant or a Result.

The OPERATOR_ID field may provide a unique identifier of an operator that may be used with that particular operand value. The MINIMUM_VALUE field may provide the low end value of the range or the actual value if no maximum value is specified in the row. The CREATED_BY field may provide the ID of the user that created this record.

The CREATED_TS field may provide the date and time that this record was created. The VERSION field may provide a sequential number used to identify historical changes to a particular bill request type configuration. The LAST_MODIFIED_BY field may provide the Application or User which last modified the bill request type configuration row.

The LAST_MODIFIED_TS field may provide the date and time that the bill request type configuration row was last modified. The MAXIMUM_VALUE field may provide the high end value of the range.

TABLE 8

RETAILER_POLICY

| Col. Seq | Column | Nulls | Type |
|---|---|---|---|
| 5 | RETAILER_POLICY_ID | NOT NULL | NUMBER (18) |
| 12 | POLICY_NAME | NOT NULL | VARCHAR2 (50) |
| 15 | BEGIN_DT | NOT NULL | DATE |
| 25 | PRIORITY | NOT NULL | NUMBER (10) |
| 40 | RETAILER_POLICY_GROUP_ID | NULL | NUMBER (18) |
| 42 | CREATED_BY | NOT NULL | VARCHAR2 (30) |
| 43 | CREATED_TS | NOT NULL | TIMESTAMP ( ) |
| 53 | VERSION | NULL | NUMBER (10) |
| 90 | LAST_MODIFIED_BY | NULL | VARCHAR2 (30) |
| 100 | LAST_MODIFIED_TS | NULL | TIMESTAMP ( ) |
| 110 | END_DT | NULL | DATE |

Primary Key
Name        Column
RETPOL_PK   RETAILER_POLICY_ID
Foreign Keys
POLICY_POLGRP_FK01
RETAILER_POLICY_GROUP_ID references
RETAILER_POLICY_GROUP.RETAILER_POLICY_GROUP_ID
Transferable?  Yes   Update Rule:   Restricted
Mandatory?     Yes   Delete Rule:   Restricted
Index Summary

| Name | Seq. | Column | Index Type |
|---|---|---|---|
| POLICY_UK01_INDX | 5 | RETAILER_POLICY_GROUP_ID | UNIQUE |
| POLICY_UK01_INDX | 10 | PRIORITY | UNIQUE |

The RETAILER_POLICY table defines an individual policy that has been defined for a specific retailer and the given policy group type. The policy with the lowest priority (highest number) may be considered the default policy. The table includes two lists: 1) all results returned by the policy and 2) all determinants defined for the policy.

The RETAILER_POLICY_ID field may provide a unique ID for the policy. The POLICY_NAME field may provide the name of the policy. The BEGIN_DT field may provide the date that this will be in effect. The PRIORITY field may provide a priority indicating in what order policies will be evaluated. For example, the highest priority (lowest number) may be evaluated first.

The RETAILER_POLICY_GROUP_ID field may provide a unique id for the policy group. The CREATED_BY field may provide the ID of the user or process that created the record. The CREATED_TS field may provide the date the record was created.

The VERSION field may provide a version number of the row. When the row is modified, the version number may be incremented. The LAST_MODIFIED_BY field may provide the Application or User which last modified the bill request type configuration row. The LAST_MODIFIED_TS field may provide the date and time that the bill request type configuration row was last modified. The END_DT field may provide the date after which the policy will no longer be in effect.

TABLE 9

RETAILER_POLICY_GROUP

| Col. Seq | Column | Nulls | Type |
|---|---|---|---|
| 5 | RETAILER_POLICY_GROUP_ID | NOT NULL | NUMBER (18) |
| 15 | VERSION | NOT NULL | NUMBER (10) |
| 25 | POLICY_GROUP_TYPE | NOT NULL | NUMBER (18) |
| 35 | RETAILER_ID | NOT NULL | NUMBER (18) |
| 42 | CREATED_BY | NOT NULL | VARCHAR2 (30) |
| 43 | CREATED_TS | NOT NULL | TIMESTAMP ( ) |
| 90 | LAST_MODIFIED_BY | NULL | VARCHAR2 (30) |
| 100 | LAST_MODIFIED_TS | NULL | TIMESTAMP ( ) |

Primary Key
Name       Column
POLGRP_PK  RETAILER_POLICY_GROUP_ID
Index Summary

| Name | Seq. | Column | Index Type |
|---|---|---|---|
| POLGRP_SK01_INDX | 5 | RETAILER_ID | NOT UNIQUE |

The RETAILER_POLICY_GROUP table may be stored at the retailer level to act as a cross-reference to the POLICY_GROUP_DEFINITION table. It may include a list of policies created for the retailer using the given policy group definition as a template.

The RETAILER_POLICY_GROUP_ID field may provide a unique ID for the policy group. The VERSION field may provide a version number of the row. When the row is modified, the version number may be incremented. The POLICY_GROUP_TYPE field may provide a unique identifier for the Policy Group Type.

The RETAILER_ID field may provide a unique identifier for the retailer. The CREATED_BY field may provide the ID of the user or process that created the record. The CREATED_TS field may provide the date the record was created. The LAST_MODIFIED_BY field may provide the Application or User which last modified the bill request type configuration row. The LAST_MODIFIED_TS field may provide the date and time that the bill request type configuration row was last modified.

Figure 3:
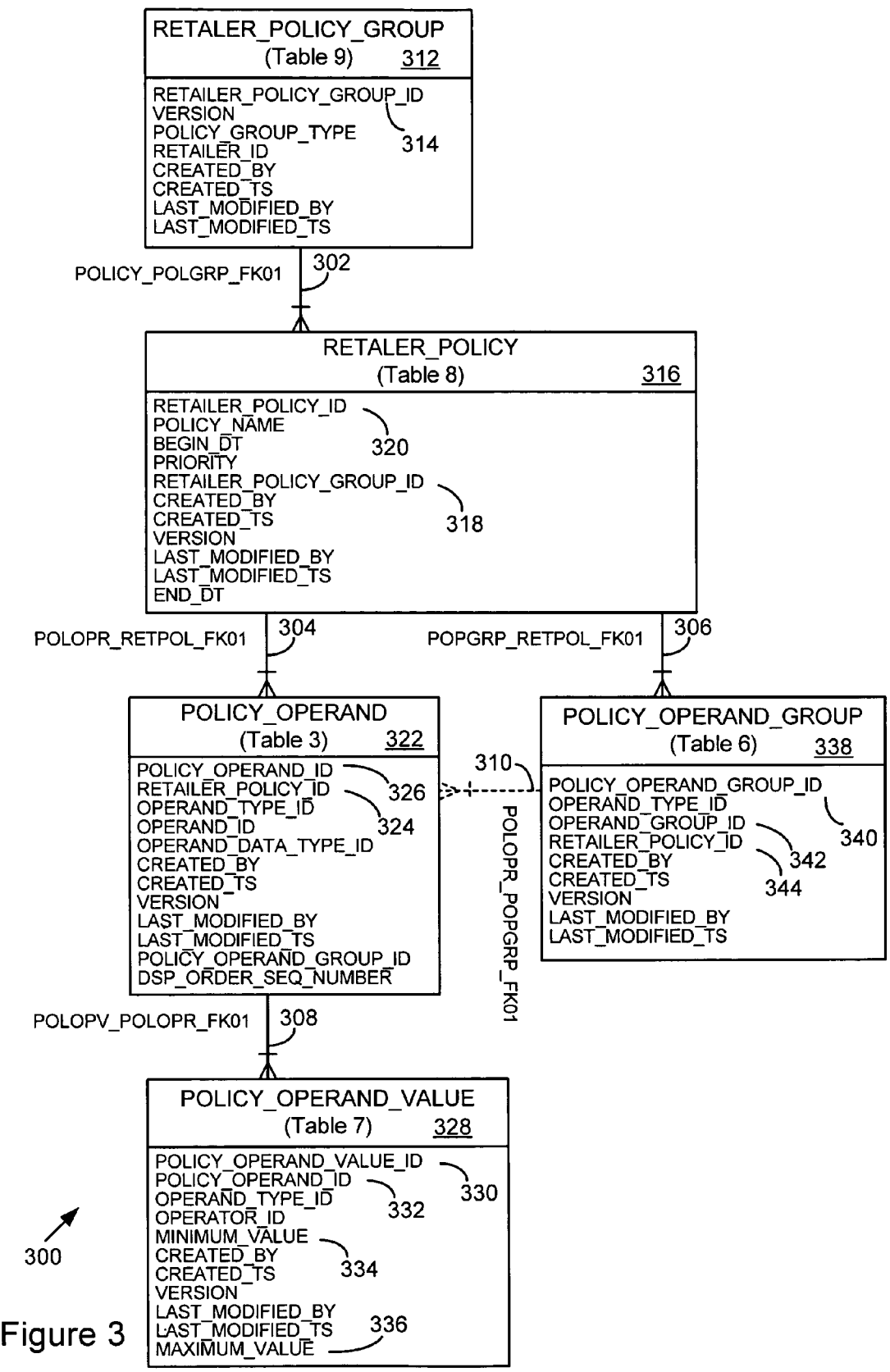
FIG. 3 shows a database interrelation diagram of database tables for customer policy groups.

With regard next to FIG. 3, that figure shows a database interrelation diagram 300 of database tables for retailer policy groups, including the fields in each table. The diagram 300 also shows how the foreign keys 302, 304, 306, 308, and 310 link the database tables. One exemplary implementation of the database tables shown in FIG. 3 is set forth above. Other data structures may be employed or substituted for representing the policies and policy groups, however. Thus, rather than, or in addition to database tables, the policies and policy groups may be represented by data structures supported by one or more programming languages such as Java, C++, or other programming languages.

In FIG. 3, the policy group table 312 includes a group identifier field 314 for storing a group identifier for a policy group. The policy table 316 also includes a group identifier field 318 for associating any given policy with a particular policy group. The policy table 316 also includes a policy identifier field 320 for identifying a policy. Accordingly, multiple policies may be assigned different policy identifiers, yet link back to the same policy group.

Note also that in one implementation, a policy operand table 322 includes a policy identifier field 324 and an operand identifier field 326. As explained above, an operand may represent either a determinant or a resultant. Consequently, any given operand specified in the operand table 322 may be linked back to a policy through the policy identifier field 324.

Values for the operand may be retained by the policy operand value table 328. The value table 328 includes a value identifier field 330 and an operand identifier field 332. The value table 328 also includes, as examples, value fields 334 and 336 for storing operand values. Any given operand value may be linked back to its operand table 322 through the operand identifier field 332.

The operand group table 338 provides a mechanism through which operands are grouped together for a policy. The operand group table 338 includes an operand group identifier 340. The operand group table 338 is interlinked with the policy table 316 and the policy operand table 322 through the operand group identifier 342 and the policy identifier 344.

Figure 4:
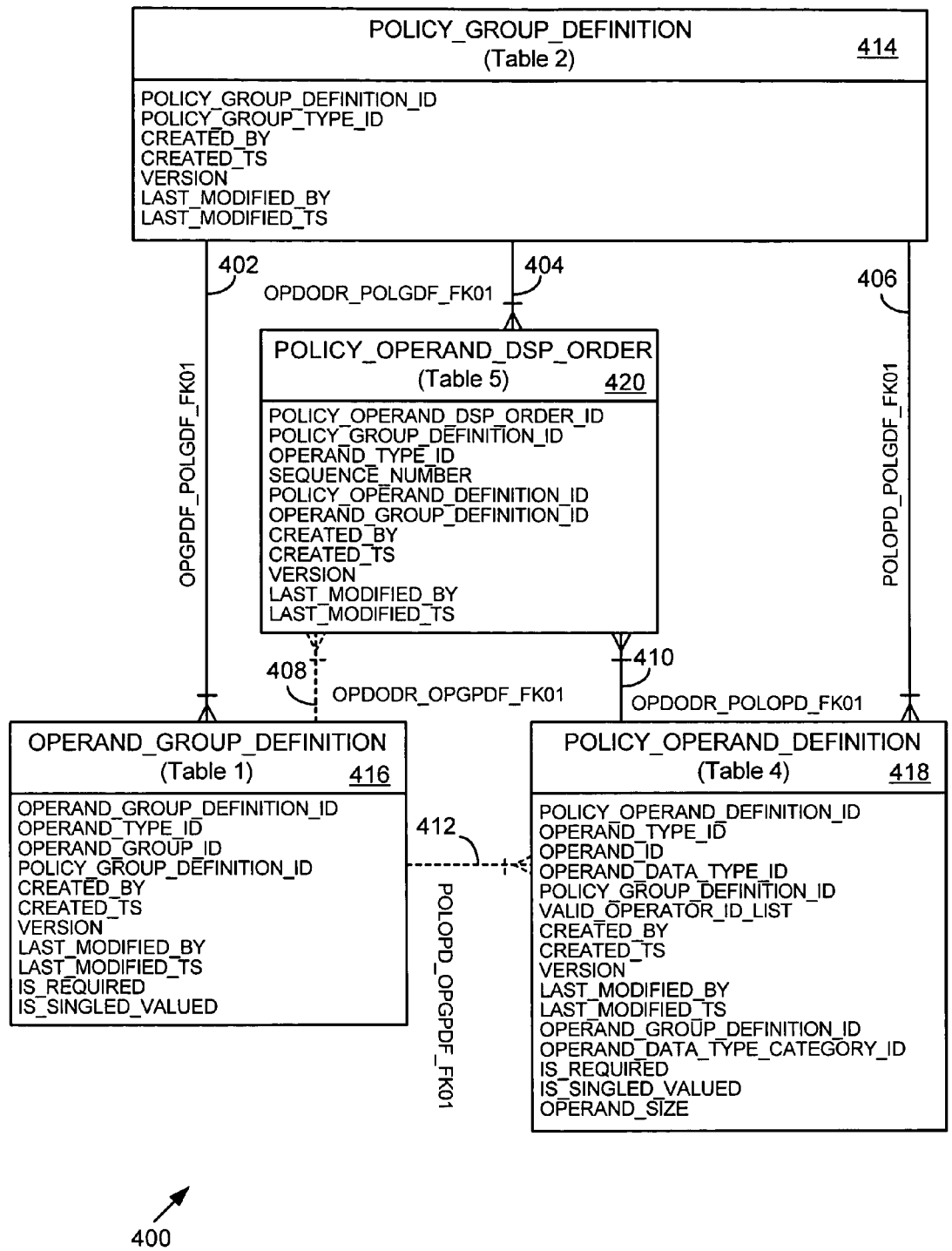
FIG. 4 shows a database interrelation diagram of database tables for policy group definitions.

In a similar manner, FIG. 4 shows a database interrelation diagram 400 of database tables for policy group definitions. Like FIG. 3, FIG. 4 shows how the foreign keys 402, 404, 406, 408, 410, and 412 link certain database tables. Example implementations for the database tables shown in FIG. 4 are given in the Tables 1, 2, 4, and 5.

More specifically, the diagram 400 shows a policy group table 414, an operand group table 416, an operand table 418, and an operand display order table 420. The database tables 414-418 may establish the policy groups, operands, and operand definitions that the customers may employ for forming their own policies through the database tables shown in FIG. 3. To that end, the policy group table 414 establishes a policy group definition and the operand group table 416 may define groups of operands for the policy group. Similarly, the operand table 418 may define the operands for each policy group, while the display order table 420 may specify, for the user interface 120, how to display any given operand.

Figure 12:
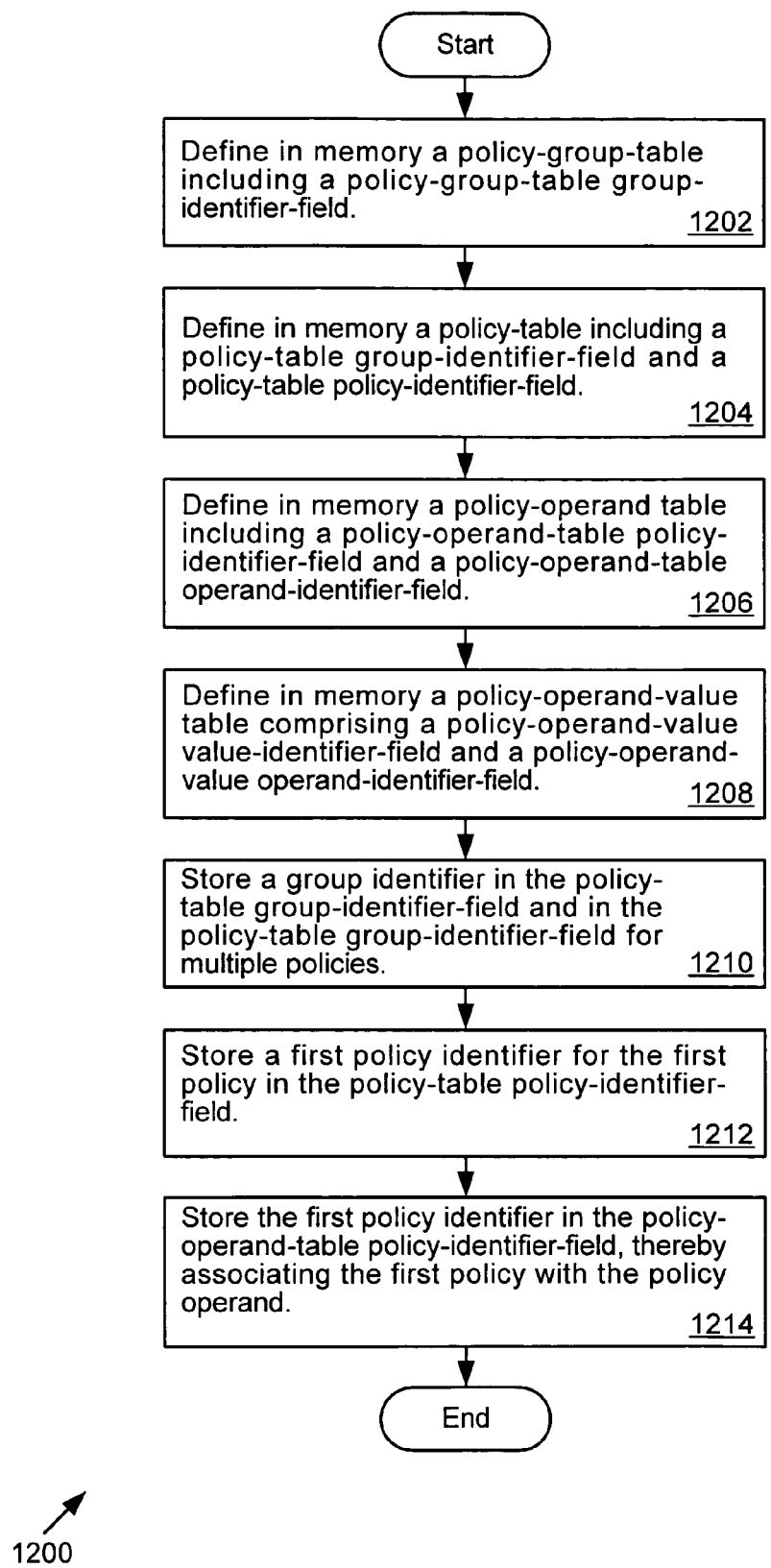
FIG. 12 shows a flow diagram of the processing acts performed by the processing system shown in FIG. 1 to setup and configure policy groups and policies belonging to the policy groups.

Turning briefly to FIG. 12, the figure shows a flow diagram 1200 of the processing acts performed by the processing system shown in FIG. 1 to setup and configure policy groups and policies belonging to the policy groups. The processing system 100 defines (e.g., through database tables) in memory a policy group table 312 including a group identifier field 314 (Act 1202). The processing system 100 also defines in memory a policy table 316 including a group identifier field 318 and a policy identifier field 320. Similarly, the policy operand table 322 may be defined in memory (Act 1206) along with an operand value table 328 (Act 1208).

The processing system 100 stores a group identifier for a policy group in the group identifier field 314 and links policies to the policy group (Act 1210). In that regard, the processing system may store the same group identifier in the policy table 316 for the policies that belong to the policy group indicated by the group identifier.

Similarly, to associate operands with policies, the processing system 100 may first store a policy identifier in the policy identifier field 320 in the policy table 320 (Act 1212). The same policy identifier may then be stored in the policy identifier field 324 for each operand belonging to that policy (Act 1214).

In order to assign a value to an operand, the processing system 100 employs the operand value table 328. For example, the processing system 100 first associate an operand value record with an operand by storing an operand identifier in the identifier field 326 and in the identifier field 332. The processing system 100 may then store values in the value fields 334 and 336 to set the operand value.

Figure 5:
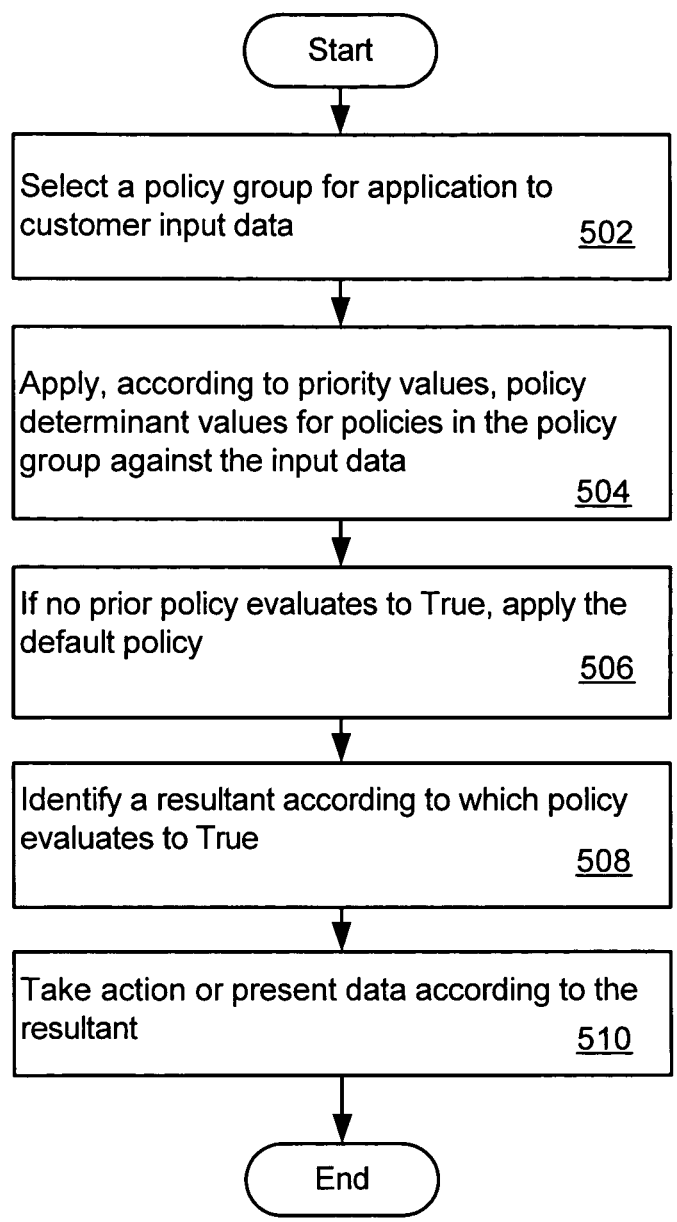
FIG. 5 shows the processing acts that the data processing system shown in FIG. 1 may take to process customer data according to policy groups.

Turning next to FIG. 5, that figure shows a flow diagram 500 of the processing acts that the evaluation program 116 in the data processing system 100 may take to process customer data 112 or system internal data 114 according to policy groups. The evaluation program 116 select a policy group for application to customer input data (Act 502). Thus, for example, if the data processing system 100 is preparing invoices, the evaluation program 116 may select a policy group for determining which invoice format to employ for each customer.

The evaluation program 116 applies each policy rule in a policy group according to its priority values. In doing so, the evaluation program 116 applies the policy determinant values for policies in the policy group against the input data (Act 504). When no prior policy evaluate to True, the evaluation program may apply a default policy in the policy group (Act 506).

By applying the policy rules against the input data, the evaluation program 116 identifies a resultant according to which policy evaluates to True (Act 508). The data processing system 100 may then take the appropriate action or present data according to the resultant, for example, by preparing a customer invoice according to a determined template format.

The discussion below focuses on several exemplary aspects of the user interface 120. In general, the user interface 120 may be implemented in many manners. Where specific examples are given for buttons, drop down lists, and other controls, it is noted that other control elements may be substituted instead. Accordingly, the user interface 120 may employ radio buttons, drop down lists, selection boxes, text entry fields, scroll bars, drop down menus, selection buttons, toggle buttons, or any other type of user interface element for implementing the features explained below.

The policy configuration user interface definition 118 includes text and graphical element positioning, size, and characteristic data that dictates how each element in each interface appears on the screen. Thus, for example, the interface definition 118 may specify a position, size, label, and length for a text entry field, several buttons, and a checkbox control. Similarly, the interface definition 118 may specify the realization of an interface element. As an example, the realization of an interface element may be a drop down list, radio button, text entry field, or another identifier of the form and function of the interface element.

Figure 6:
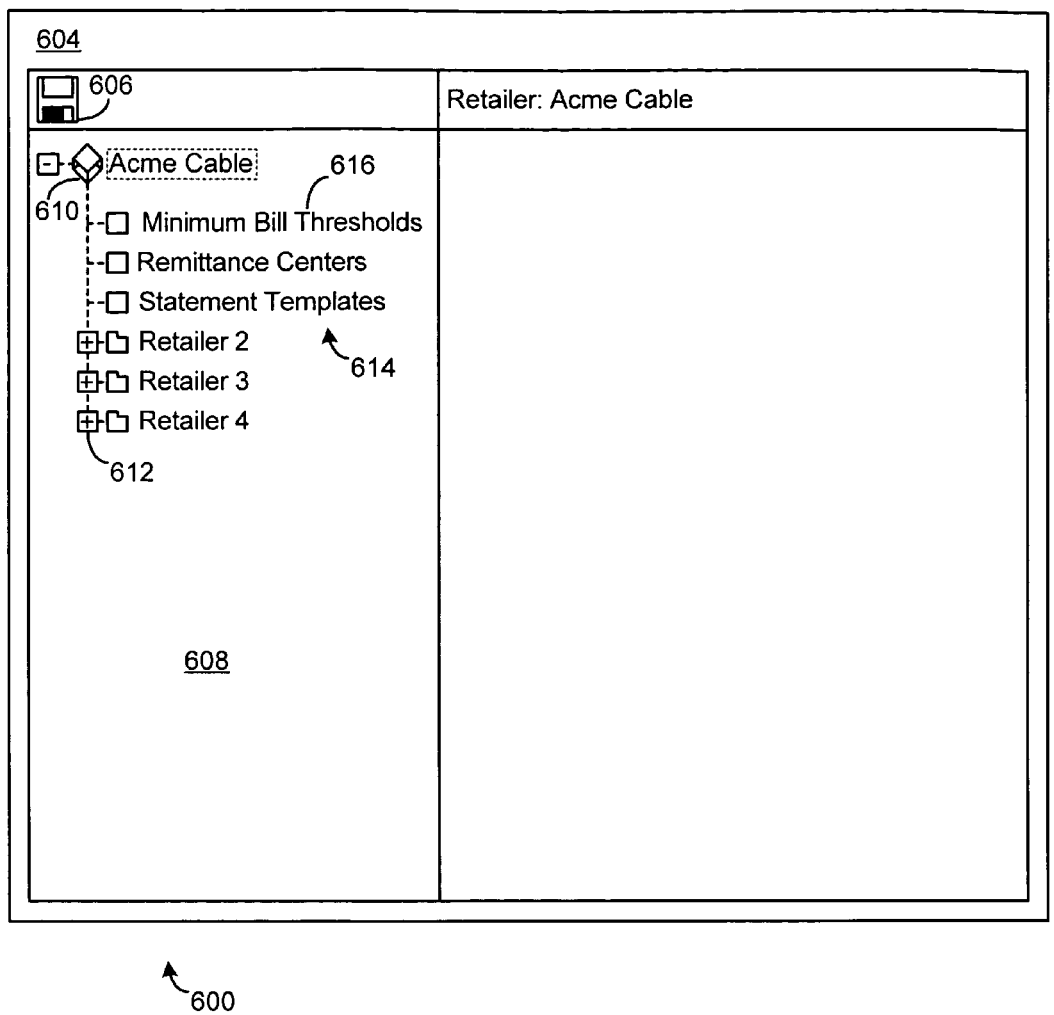
FIG. 6 depicts a configuration maintenance interface of a ruleset user interface that the data processing system shown in FIG. 1 may display.

FIG. 6 depicts a configuration maintenance interface 600. In this example, the maintenance interface 600 allows the operator to modify billing statement preparation features associated with one or more retailers. The interface 600 may be part of the ruleset user interface 120 that the processing system 100 generates for interaction with a system operator. The interface 600 may be implemented in HTML and Java for convenient display with a web browser window 604, for example. The interface 600 may be implemented in other manners, however.

The maintenance interface 600 includes a save icon 606 and a retailer tree view 608. The retailer tree view 608 includes a node for each retailer supported by the application. The node 610 represents Acme Cable company, for example. The retailer tree view 608 also includes list expanders 612, and retailer information entries 614. The save icon 606 is an operator selectable icon that directs the processing system 100 to save all changes made to any of the operator adjustable features described below.

The retailer tree view 608, through the list expanders 612, allows an operator to select any retailer supported by the statement preparation system. As shown FIG. 6, Acme Cable is selected. When an operator selects a retailer from the retailer tree view 608, the tree view 608 expands to show the retailer information entries 614.

The operator may select any of the retailer information entries 614, for example by clicking the mouse cursor or through keyboard input. By doing so, the ruleset user interface 120 will present the operator with additional interface screens through which the operator may modify the policies present in the associated policy group. In the example discussed below, it is assumed that the operator has selected the minimum bill threshold information entry 616. However, the user interface 120 may respond in a similar manner regardless of the information entry selected.

Figure 7:
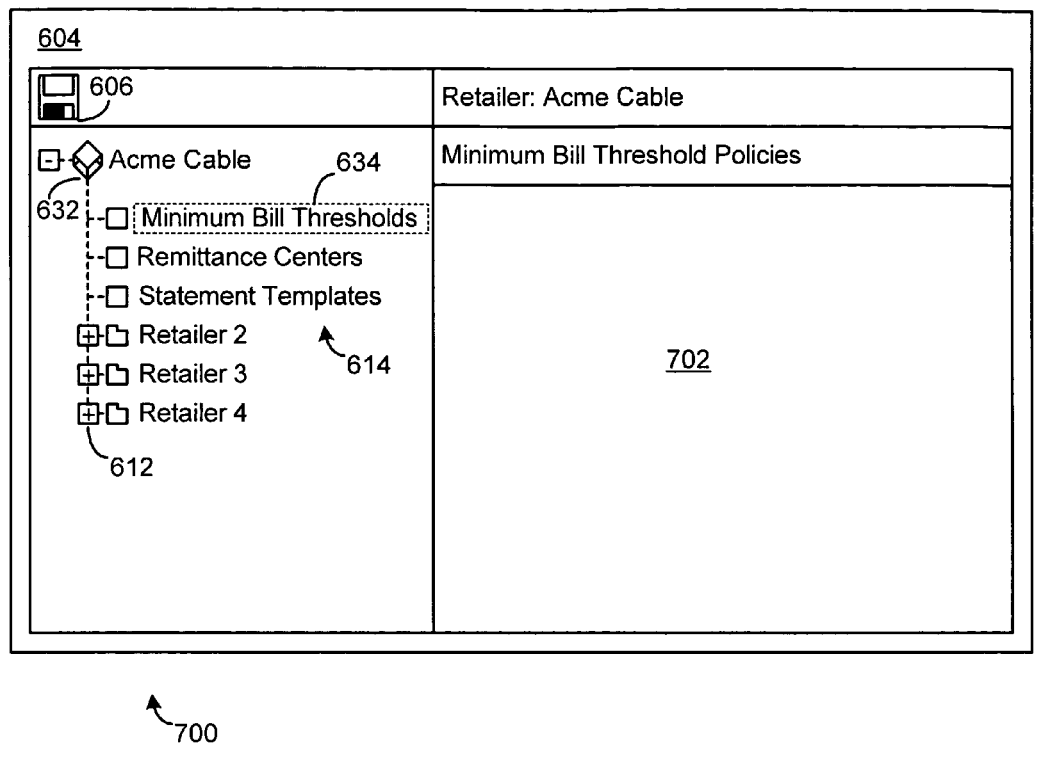
FIG. 7 shows a policy display interface of a ruleset user interface that the processing system shown in FIG. 1 may display.

As shown in FIG. 7, the ruleset user interface 120 responsively displays the policy configuration detail interface 700. The policy configuration detail interface 700 includes the policy detail panel 702. The policy detail panel 702 lists each policy in the minimum bill threshold policy group, and presents appropriate modification buttons. In other words, the detail panel 702 displays a policy set associated with a policy group.

FIG. 8 shows one example implementation of the policy detail panel 702. The policy detail panel 702 presents the minimum bill threshold policy group 802. The policy group 802 includes multiple policies 804, each with a priority value 806. Each policy 804 is formed from the policy determinants 808, and specifies a resultant 810. As explained above, each policy 804 may be associated with an effective begin date 812 and end date 814.

The detail panel 702 further includes a set of modification buttons. The modification buttons include an "Add" button 816 and a "Modify" button 818. The modification buttons further include a "Priorities" button 820 and a "Copy" button 822.

As shown in FIG. 8, the determinants 808 include "Account Type", "Delivery Method", "Begin Date", and "End Date". The resultant indicates whether or not to print a bill for the account when the policy evaluates to True, and is given by the "Print" resultant 810. As an example, the "Minimal" policy indicates that where the Amount is less than $1.00, and the Account Type is Regular, and the Delivery Method is Both, then the statement system should not print a billing statement for the customer. Note that the "Minimal" policy is in effect from Jan. 1, 2002 until Aug. 26, 2007.

The statement preparation system processes the policies 804 in order of priority 806. In doing so, the statement preparation system ensures that each policy is in effect by checking the policy begin date 812 and the policy end date 814. When no previous policy evaluated to True, the Default policy determines whether to print a bill. In this example, the Default policy specifies that a bill will not be printed.

The operator may modify the policy group 802. As examples, the operator may add a policy, modify an existing policy, or change a policy priority. To that end, the user interface 120 responds to the modification buttons 816-822 as explained below.

FIG. 9 shows a policy configuration interface 900 that the user interface 120 may display for adding or modifying a policy. The policy configuration interface 900 generally provides input mechanisms (e.g., buttons, text fields, drop down lists, and other input mechanisms) through which the operator can modify the determinants, policy name, begin and end dates, and determinant tests associated with each policy.

As shown in FIG. 9, the configuration interface 900 includes a policy name field 902, a minimum bill amount field 904, a begin date 906, and an end date 908. Calendar icons 910 and 912 are present and provide a convenient pop up calendar useful for rapid date entry. The begin date field may be employed to determine when a policy will start. Similarly, the end date field may be employed to specify when a policy will expire.

The configuration interface 900 further includes a determinant selector 914 and a determinant value selector 916. An operator selector 918 is also present for selecting an operator (e.g., "=", "<", ">", "< >", "<=", ">=", or another operator). The selectors 914-918 may be implemented, for example, as drop down boxes that the processing system 100 populates with values appropriate for each determinant, as determined by the data model discussed above.

The configuration interface 900 also includes a determinant panel 920. The determinant panel 920 lists determinants 922 that may be modified through the selectors 914-918, and that have currently been assigned a value 924. Additionally, the configuration interface 900 includes the following configuration buttons: Add 926, Remove 928, OK 930, Clear 932, and Cancel 934.

With reference back to FIG. 8, when the operator selects the Add modification button 816, the processing system 100 responds by presenting the configuration interface 900 with each entry blanked out, ready to receive input for a new policy. As noted above, it is not necessary to set a value for every determinant. Rather, any determinant for which no value is provided is considered met automatically.

Accordingly, the operator may then enter a policy name in the name field 902, and at their discretion, set the minimum bill amount in the bill amount field 904 and provide values for the Account Type and Delivery Method determinants through the selectors 914-918. With regard to the determinants set through the selectors 914-918, the Add button 926 directs the processing system 100 to add the determinant value to the policy, and to display the determinant and its value in the determinant panel 920. Similarly, the Remove button 928 directs the processing system 100 to remove the determinate value from the policy, and to remove the determinant and its value from the determinant panel 920.

The operator may then enter a begin date in the begin date field 906, either by typing the date into the field, or selecting a date through the calendar icon 910. Similarly, the operator may enter an end date in the end date field 906, either by typing the date into the field, or selecting an end date through the calendar icon 912.

When the operator is finished adding the new policy, the operator may press the OK button 930 to direct the processing system 100 to accept and save the new policy. The processing system 100 responsively updates the policy rule database 110 to add the new policy to the policy group. The operator may click on the Clear button 932 to remove all the values previously added to the new policy. Similarly, the operator may click on the Cancel button 934 to return to the configuration detail interface 700 without adding a new policy to the policy group.

Again with reference to FIG. 8, when the operator selects the Modify button 818, the processing system 100 displays the configuration interface 900. In this case, however, the processing system 100 populates the fields in the configuration interface 900 with the values already existing for the selected policy. The operator may then modify the policy as explained above.

The processing system 100 responds in a similar manner when the operator clicks the Copy button 822. More specifically, the processing system 100 populates the configuration interface 900 with values copied from the currently selected policy in the detail panel 702. The operator may then enter a new name for the policy and proceed as explained above to set values for the new policy.

The user interface 120 additionally supports modification of policy priorities. To that end, when the operator selects the Priorities button 820, the user interface 120 presents the priority configuration interface 1000 shown in FIG. 10. The priority configuration interface includes a policy detail panel 1002, a priority adjustment panel 1004, and a command buttons 1006.

The policy detail panel 1002 displays each policy in the minimum bill threshold policy group, including its priority 806. The adjustment panel 1004 includes a priority increase control 1006 and a priority decrease control 1008. The command buttons include an OK button 1010, a Reset button 1012, and a Cancel button 1014.

The priority configuration interface 1000 may initially display the policies in ascending priority order. In one implementation, the Default policy has the lowest priority (highest priority number). In order to reprioritize a policy, the operator first selects the policy in the detail panel 1002. The configuration interface 1000 responsively highlights the selected policy, in this example the Minimal policy 1010.

Figure 10:
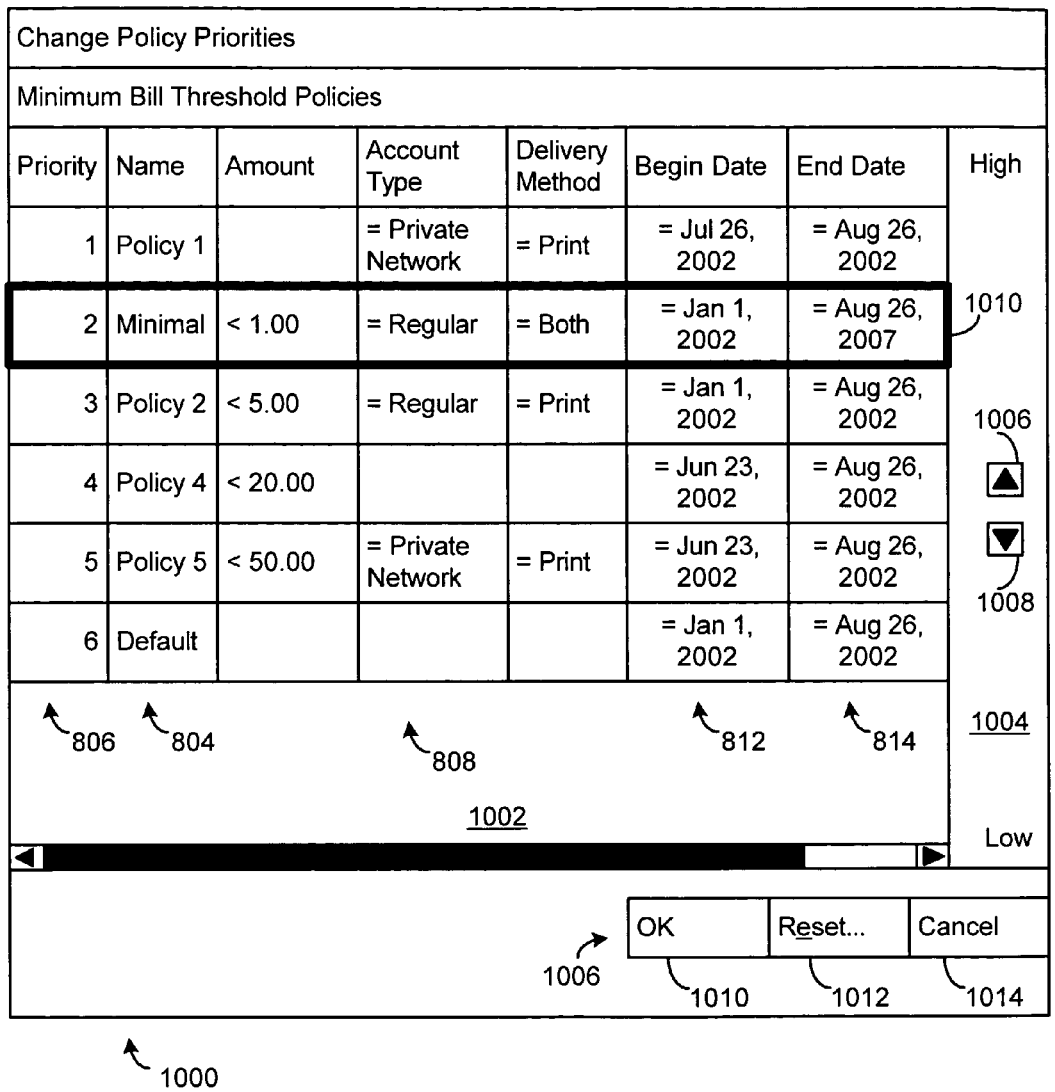
FIG. 10 depicts a policy priority configuration interface of a ruleset user interface generated by the processing system shown in FIG. 1.

Subsequently, the operator may use the controls 1006 and 1008 to increase or decrease the policy priority as desired. The processing system 100 may automatically re-prioritize other policies affected by the change. For example, as shown in FIG. 10, the operator clicks on the control 1006 to increase the priority for the Minimal policy 1010 from 3 to 2. Because another policy ("Policy 2") already has a priority of 2, the processing system 100 lowers the Policy 2 priority to 3, and sets the priority of the Minimal policy 1010 to 2.

When the operator is satisfied with the policy priorities, the operator may click the OK button 1010. In response, the processing system 100 saves the new priorities and returns the operator to the detail interface 700. In response to the Reset button 1012, the processing system 100 will return all priorities to the values they had when the priority configuration interface 1000 was first displayed. The Cancel button 1014 returns the operator to the detail interface 700 without saving any changes.

Figure 11:
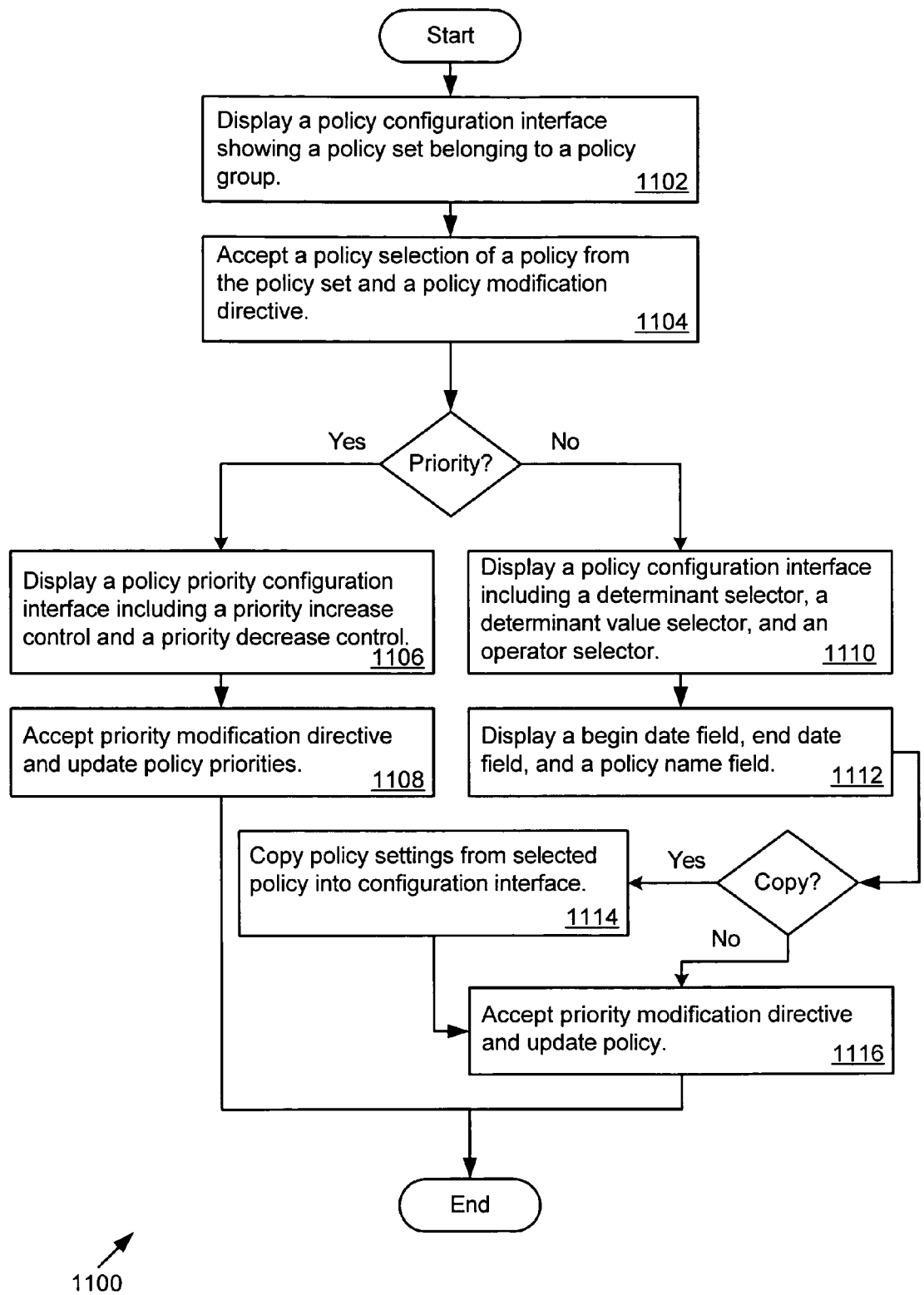
FIG. 11 shows a flow diagram of the processing acts performed by the processing system shown in FIG. 1 to interface an operator to policy configuration processing performed in the data processing system.

FIG. 11 shows a flow diagram 1100 of the processing steps performed by the processing system shown in FIG. 1 to interface an operator to policy configuration processing performed in the data processing system. The processing system 100, in accordance with the policy configuration user interface definition 118, displays a policy configuration interface 700 that shows a policy set belonging to a policy group (Act 1102). For example, the policy set may be displayed in the detail panel 702 as individual policies.

The processing system 100 then accepts a policy selection of a policy from the policy set and a policy modification directive (Act 1104). For example, the policy selection may be a mouse click on an individual policy, or keyboard input to highlight an individual policy. Similarly, the policy modification directive may be a mouse click or keyboard input to select one of the configuration buttons 816-822.

Accordingly, when the operator has selected the Priorities button 820, the processing system 100 displays the policy priority configuration interface 1000 (Act 1106). The configuration interface 1000 includes, as examples, the detail panel 1002, the adjustment panel 1004 with the priority increase control 1006 and priority decrease control 1008, and the command buttons including the OK button 1010, Reset button 1012, and Cancel button 1014.

As explained above, the processing system 100 accepts a policy priority modification directive for a selected policy. The modification directive may be a mouse or keyboard activation of the increase control 1006 or the decrease control 1008, as examples. The processing system 100 responsively updates the policy priorities in the policy group (Act 1108).

As another alternative modification directive, the operator may choose to Add or Copy a policy. In response, the processing system 100 displays a policy configuration interface 900, including the selectors 914-918 (Act 1110). The configuration interface 900 may also include, as examples, the begin date field 906, the end date field 908, and the policy name field 902 (Act 1112). In general, the configuration interface 900 displays one or more characteristics of the policy that the operator may modify and a user interface input element (e.g., the text field 904) for accepting input with regard to that characteristic.

If the operator selected the Copy button 822, then the processing system 100 will copy the selected policy characteristics into the input fields of the configuration interface 900 (Act 1114). The operator may then change only the fields desired, while the rest remain unchanged. Alternatively, if the operator selected the Add button 816, then the processing system may instead display the configuration interface 900 blanked out, ready for new input.

In either case, the processing system 100, through then configuration interface 900, accepts priority modification directives from the operator (Act 1116). As examples, the processing system 100 may accept text input for the policy name, date input for the begin date and end date, and drop down list selections for the policy determinant values. The processing system 100 updates the policy accordingly so that it is ready the next time it is applied to customer or internal data.

The rules processing system explained above thereby provides an extensible sophisticated rules processing engine for customer or internal data. Each customer may conveniently tailor the engine to apply a wide range of policies against their input data. Consequently, the customer may develop and modify over time sophisticated processing patterns, without the time and expense associated with obtaining a custom solution from a software vendor.

It is therefore intended that the foregoing detailed description be regarded as illustrative rather than limiting, and that it be understood that it is the following claims, including all equivalents, that are intended to define the spirit and scope of this invention.

The invention claimed is:

1. A method in a data processing system for interfacing an operator to policy configuration processing performed by the data processing system, the method comprising:
    displaying a policy configuration interface comprising a policy set belonging to a policy group;
    associating the policy group with a determinant group comprising data items from customer data;
    associating each policy within the policy group with a priority value and a resultant specifier, and selecting a highest possible priority value by evaluating the determinant group against input customer data or system internal data to specify a policy selection;
    accepting the policy selection of a policy from the policy set;
    displaying a policy modification interface for the policy;
    accepting a policy modification directive through the policy modification interface for the policy; and
    modifying the policy in the policy group according to the policy modification.

2. The method of claim 1, where the policy set comprises a Default policy that evaluates to True.

3. The method of claim 1, where displaying the policy modification interface comprises the act of displaying a priority configuration interface.

4. The method of claim 3, where displaying the priority configuration interface comprises displaying a priority increase control and a priority decrease control.

5. The method of claim 1, where displaying the policy modification interface comprises the act of displaying a policy configuration interface comprising a determinant selector and a determinant value selector.

6. The method of claim 5, further comprising the act of populating the determinant selector and determinant value selector with entries obtained from a data model for the policy group.

7. The method of claim 1, where displaying the policy modification interface comprises displaying a policy configuration interface comprising a policy name field and a begin date field.

8. A data processing system comprising:
    a display;
    a memory comprising a policy configuration user interface definition comprising:
    a policy configuration detail interface comprising a policy detail panel for displaying a policy set belonging to a policy group; and
    a policy configuration interface; and
    and a processor for generating on the display a policy configuration interface according to the policy configuration interface definition
    wherein the processor associates the policy group with a determinant group comprising data items from customer data, and associates each policy within the policy group with a priority value and a resultant specifier, and selects a highest possible priority value by evaluating the determinant group against input customer data or system internal data to specify a policy selection.

9. The data processing system of claim 8, where the policy configuration interface comprises a determinant selector and a determinant value selector.

10. The data processing system of claim 9, where the determinant selector and determinant value selector comprises entries obtained from a data model for the policy group.

11. The data processing system of claim 9, where the priority configuration interface comprises a priority increase control and a priority decrease control.

12. The data processing system of claim 8, where the policy configuration interface comprises a policy name field.

13. The data processing system of claim 8, where the user interface definition further comprises a priority configuration interface.

14. A machine readable memory encoded with instructions that cause a data processing system to perform a method comprising the acts of:
    displaying a policy configuration interface comprising a policy set belonging to a policy group; associating the policy group with a determinant group comprising data items from customer data;
    associating each policy within the policy group with a priority value and a resultant specifier, and selecting a highest possible priority value by evaluating the determinant group against input customer data or system internal data to specify a policy selection; accepting the policy selection of a policy from the policy set;
    displaying a policy modification interface for the policy; accepting a policy modification directive through the policy modification interface for the policy; and
    modifying the policy in the policy group according to the policy modification.

15. The machine readable memory of claim 14, where displaying the policy modification interface comprises the act of displaying a priority configuration interface.

16. The machine readable memory of claim 15, where displaying the priority configuration interface comprises displaying a priority increase control, a priority decrease control, and a policy detail panel.

17. The machine readable memory of claim 14, where displaying the policy modification interface comprises the act of displaying a policy configuration interface comprising a determinant selector and a determinant value selector.

18. The machine readable memory of claim 17, further comprising the act of populating the determinant selector and determinant value selector with entries obtained from a data model for the policy group.

19. The machine readable memory of claim 14, where displaying the policy modification interface comprises the act of displaying a policy configuration interface comprising policy information copied from the policy.

20. The machine readable memory of claim 14, where accepting a policy modification directive comprises accepting at least one of a policy end date entry and a policy begin date entry.

* * * * *